Nov. 28, 1961        J. A. FOLSE        3,010,620
PROCESS AND APPARATUS FOR HANDLING PARTICULATE MATERIAL
Filed March 22, 1960        2 Sheets-Sheet 1
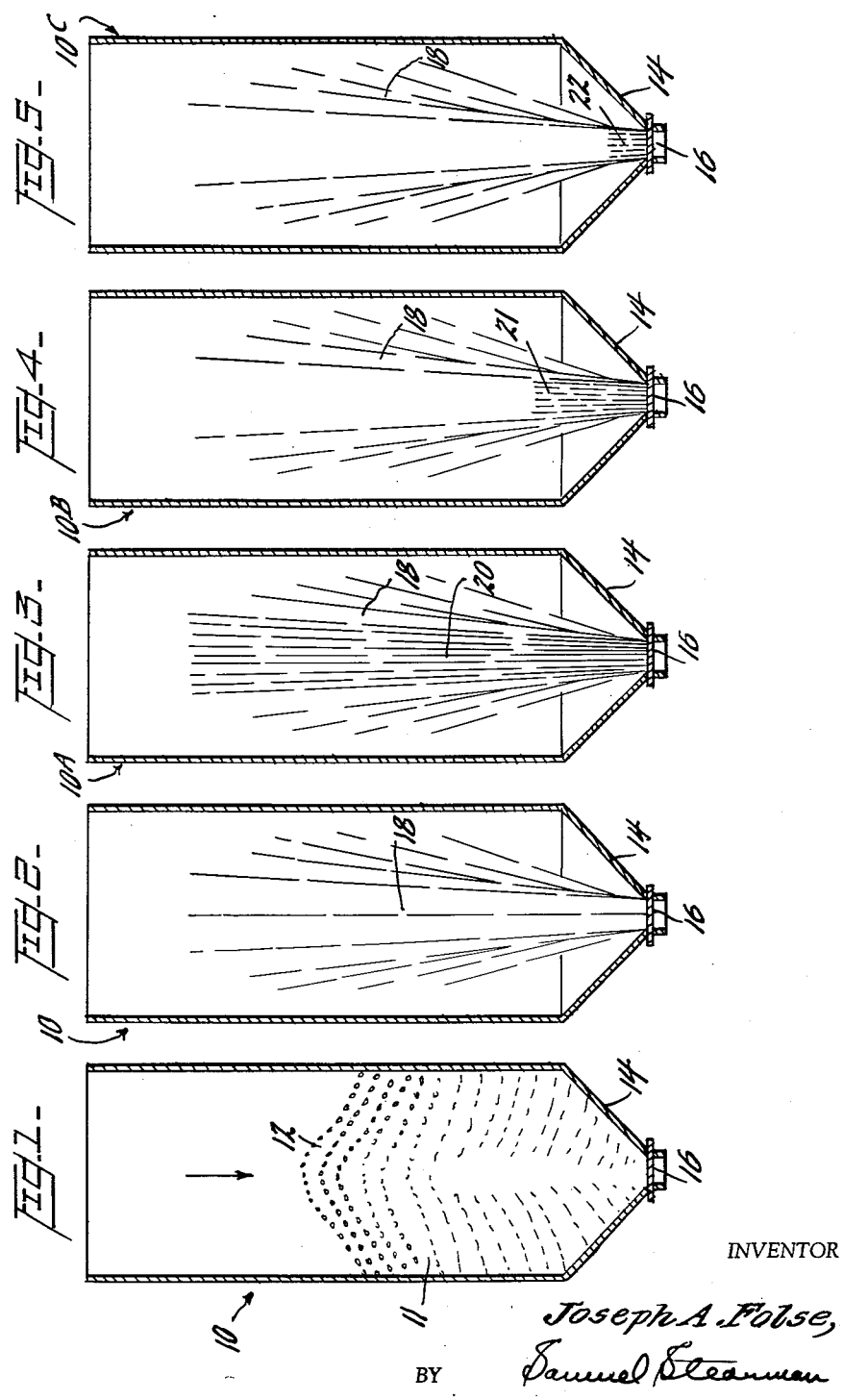
INVENTOR
Joseph A. Folse,
BY Samuel Stearman
ATTORNEY

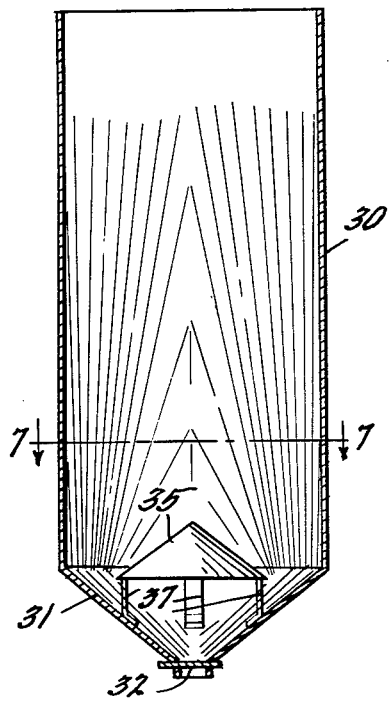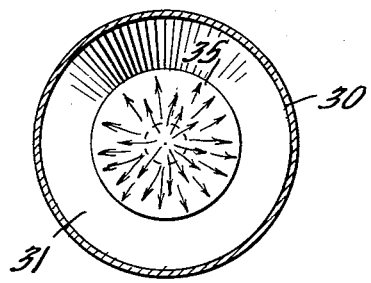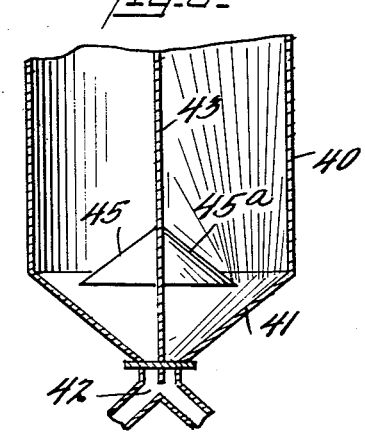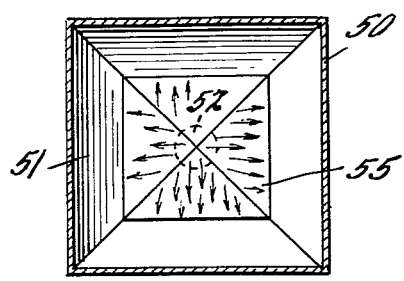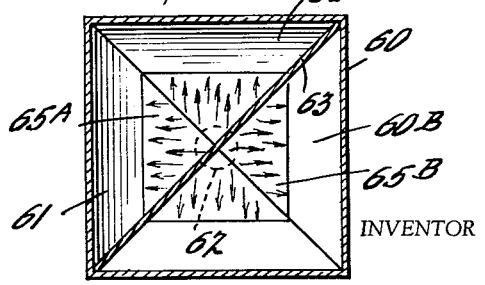
INVENTOR
Joseph A. Folse,
BY Samuel Stearman
ATTORNEY

3,010,620
Patented Nov. 28, 1961

---

3,010,620
PROCESS AND APPARATUS FOR HANDLING PARTICULATE MATERIAL
Joseph A. Folse, Gretna, La., assignor to The Patent and Licensing Corporation, New York, N.Y., a corporation of Massachusetts
Filed Mar. 22, 1960, Ser. No. 16,724
3 Claims. (Cl. 222—564)

This invention relates to method and apparatus for handling particulate material, more especially particulate materials composed of mixtures of different size particles.

Various fabricating processes require the use of particulate material composed of mixtures of particles of different sizes. In the use of such material it is usually necessary that it be transferred from one location to another.

It has long been recognized that when particulate material composed of a mixture of different size particles is transferred from one container to another, there occurs a phenomenon referred to as segregation. By the term segregation herein is meant the property of a mass of mineral, composed of various particle sizes, to separate into similarly sized portions.

When particulate material comprising mixtures of different size particles is transferred by conveyor belt, the accompanying vibration causes the smaller particles to tend to locate nearest the surface of the belt. Similarly, when such material is flowed through pipes or tubes, the smaller particles tend to locate themselves at the bottom of the flow, owing to the fact that the coarser particles flow faster and above the finer particles. In each of the two aforementioned instances, the segregation that occurs is rarely troublesome, inasmuch as a state or equilibrium is soon reached and the coarser and finer particles are delivered to the receiver at the discharge end of the conveyor or pipe at the same instant.

In marked contrast, however, is the situation when such material is charged into a silo or similar relatively large container, particularly when it is delivered at the center of the top of the container. In such instances, the finer particles accumulate at the center of the container, while the coarser particles fall toward and accumulate adjacent the wall thereof, i.e., at points more radially remote from the vertical axis of the container, and the intermediate size particles locate themselves between the finer and coarser particles.

One industrial field in which segregation of particulate material as above set forth presents a serious problem, is that concerned with the manufacture of asphalt roofing, siding and the like, wherein mineral granules are used for surfacing the asphalt coated base sheet.

In the processing and use of such granules for the manufacture of asphalt roofing, siding and the like, it is necessary that the granules be transferred from one silo or bin to another at various times. The granules used for such manufacture are conventionally of quartz or other suitable mineral base, usually of conchoidal fracture, and are composed of mixtures of differently sized particles, varying from such as pass an 8-mesh screen to such as are retained on a 35 mesh screen.

The segregation of the granules, as herein described, gives rise, in the case of granules used in the manufacture of roofing, siding, etc., to frequent undesirable fluctuations from coarse to fine in the grading of the granules at the point at which they are ultimately applied to the asphalt coated base sheet or board. These fluctuations result in objectionable deviations from the desired color or appearance of the finished roofing, siding or the like. Moreover, a deviation in grading which amounts to a content of coarser granules 10% or more in excess of the standard has an adverse effect upon the embedding qualities of the granules. On the other hand, an excess of fines frequently results in imparting an undesirable dark appearance to the finished surface of the roofing, siding or the like, owing to the fact that the tension and pressure appropriate for embedding a granule mixture of the proper grading, are too great for the finer grading. As a result, asphalt, from the coating becomes squeezed up through the interstices between the granules and causes the finished sheet to present an undesired dark appearance. The foregoing and other undesirable effects of segregation are often sufficiently intense to result in production of finished roofing, siding or the like that is so off-grade as to require that it be scrapped.

The principal object of the present invention is to provide a method and apparatus capable of eliminating segregation of particulate material compound of mixtures of different size particles, normally occurring during storage and transfer of the same into and out of containers such as silos, bins and the like.

Another object of the invention is to provide a method and apparatus of the aforesaid character, for preventing segregation of granules used in the production of asphalt roofing, siding and the like.

Still another object of the invention is to provide a method and apparatus of the aforesaid character, which may readily be installed, at relatively little expense, in silos, bins, and the like presently in service.

Briefly stated, the elimination of segregation of granules may be achieved, according to the invention, by providing adjacent the bottom of the silos, i.e., above the discharge opening thereof, for the creation of what may be said to be a multiplicity of drain channels, disposed around a conical or like surface, which permit the flow of the particles from the mass in the container to progress substantially uniformly from the bottom level of the mass to the top level thereof (i.e., in a manner corresponding to that which would occur if the entire bottom of the container were removed) and to enable the segregated particles to become substantially completely reunited into the desired mixtures of different sized particles for discharge as such.

The invention will be more readily apparent from the description herebelow, and from the accompanying drawings, in which:

FIGS. 1 to 5, inclusive, are views diagrammatically depicting the phenomenon of segregation as it normally occurs in transferring, from one silo to another, particulate material composed of a mixture of differently sized particles, as in the case of roofing granules;

FIG. 6 is a view partly in elevation and partly in cross-section, illustrating a silo constructed for practising the present invention;

FIG. 7 is a view thereof taken along line 7—7 of FIG. 6;

FIG. 8 is a fragmentary view, illustrating another embodiment of the invention;

FIG. 9 is a view similar to FIG. 7, illustrating still another embodiment of the invention; and FIG. 10 is a similar view of still another embodiment thereof.

As briefly stated above, when particulate material such as granules used in the roofing industry are charged into a silo at the center of the top of the silo, the smaller size particles accumulate adjacent the center of the silo, whereas the coarser particles fall outwardly towards the side of the silo and the intermediate size particles locate themselves between the fine and the coarse particles. The ultimate result of this inherent tendency exhibited by the granules is illustrated in FIG. 1. As there depicted, the material charged into the silo, indicated by numeral 10, deposits more or less naturally in the form of cones, indicated at 11. Generally, these cones have their peaks 12 disposed more or less in vertical alignment with the truncated ends of the inverted cone bottom 14 of the silo. By virtue of their size, the coarser particles, as they fall and strike the peak of a cone 11, tend to roll down to the base of the cone and towards the wall of the silo. On the other hand, the finer particles have greater resistance to flow or roll and, therefore, tend to remain where they strike, namely, at or adjacent the center and peak of the cone.

When the outlet 16 of a silo thus charged with granules is opened for discharge of its contents, the initial flow and discharge naturally occurs immediately above the discharge opening where all resistance has been removed. Consequently, as depicted in FIG. 2, there is formed in the mass what is commonly referred to as a funnel, indicated at 18, into which the particles from the more radially remote portions of the mass will follow by flowing towards the center, to be eventually discharged.

Now assume the granules are required in manufacture, shipping, or use, to be transferred from silo 10A (FIG. 3) to silo 10B (FIG. 4). In charging silo 10A, some degree of segregation will have occurred as above explained. The portion represented by the shaded area 20 in FIG. 3 (commonly referred to as the "deconing" section) when delivered to silo 10B will become further segregated as explained above, so that the portion of the granules represented by shaded area 21 in silo 10B is considerably finer in its size grading than that of area 20 in silo 10A. Since the granules of area 20 in silo 10A are discharged first, in the "deconing" if silo 10A, they again become partially denuded of the coarser granules by virtue of the transfer from silo 10A to silo 10B. Similarly, when the granules in silo 10B are required to be transferred to a third silo, as silo 10C (FIG. 5) the granules in the shaded area 21 of silo 10B are discharged first in the "deconing" of silo 10B, and as a result of their transfer to silo 10C, the granules occupying the shaded area 22 in silo 10C are further denuded of coarse particles and hence will have a grading with an excess of fine particles. Consequently, for example, if the silo 10C is a bin disposed directly over a moving sheet of asphalt coated roofing felt or the like, and contains granules which are to be deposited directly onto such coated sheet, there will be fluctuations, from time to time, in the grading of the granules deposited on the sheet; that is to say, the grading will at times be excessively coarse while at other times it will be excessively fine, thereby giving rise to serious objections, such as those above mentioned.

The extent of segregation which occurs as above set forth may be more readily appreciated when stated quantitatively. Thus, for example, actual volumetric determinations which have been made show that the proportionate volume of granules in the deconing of a circular silo 20 feet in diameter and 50 feet high (slightly in excess of 15,000 cubic feet and capacity content of about 675 tons of mineral granules) is above 15% and, as indicated, would be off-grade on the fine side. Hence, this off-grade portion would amount to about 2250 cubic feet or 100 tons of the total 675 tons. In transferring the material from such a silo to another of equal size, the 100 tons from the deconing of the first silo will spread to all sections of the second silo, but in doing so will segregate still further and, again considering only the center section of the second silo, this will amount to approximately 15% of 100 tons, namely, 15 tons, which will form a part of the deconing portion of the second silo. However, that portion will contain a larger percentage of fine granules than any other portion. If the contents of the second silo are then transferred to a third silo of the same size, 15% of the 15 tons, namely 2¼ tons thereof, will constitute the center section in the third silo. Thus, as will be seen, even when dealing with relatively large quantities of material, the segregation that occurs results in the formation of a relatively small portion, yet substantial amount, containing a high percentage of the finer granules.

Efforts have heretofore been made to counteract the effects of segregation of roofing granules under the influences above stated, by dividing or quartering the silos and locating the top fill hole and the bottom discharge hole on opposite sides of each other relative to the vertical axis of the silo. Dividing and quartering the silos has the effect of merely reducing segregation by reducing the diameter and hence reducing the spread of the granules. The relocation of the fill and discharge holes effects a positioning of the granules so that the peak 12 of cone 11 (FIG. 1) will be disposed relatively close to the wall of the silo, resulting in granules of the larger sizes being the initially discharged portion, by virtue of the reduction of the height and base diameter of the deconing section.

In accordance with the present invention, segregation of granules under the influences described may be eliminated by creating within the silos a myriad of paths or channels of flow leading to the discharge opening so that the segregated granules may reunite at the discharge opening, and so that they will discharge progressively from the bottom level of the mass to the top thereof, rather than vice versa as is normally the case.

In the practice of the invention, the bins or silos, indicated by numeral 30, may be of the conventional cylindrical type, having an inverted cone bottom 31, and a suitable gate or valve at its discharge outlet 32.

In accordance with the invention, a cone 35 is suspended within the silo 30 immediately above the inverted cone bottom 31 and in axial alignment with the discharge opening 32. Cone 35 may be suspended by means of spaced vertically extending struts 37. For obtaining optimum flow of the granules and achieving the desired results, the base of cone 35 should desirably be of a diameter amounting to from 55% to 60% of the diameter of the main body of the silo, and the base of the cone should lie in a plane spaced upwardly not more than about six inches from the plane of the discharge opening at the apex of the truncated inverted cone bottom of the silo.

By means of the conical surface of the cone 35, there is created, in effect, an infinite or myriad number of drain channels around the conical surface. In consequence, the normal size of the deconing funnel formed when the granules are discharged is increased in contrast to previously suggested methods or expedients according to which it is sought to offset the effects of segregation by reducing the volume of the initial deconing portion and by selecting the size of the particles which compose that portion. According to the present invention, the size of the deconing funnel obtained by virtue of the cone 35 may be increased to include the entire contents of the silo. The effect thereof corresponds to that which would occur if the entire bottom of the silo were removed, in that it permits the granules to flow towards the discharge opening in levels progressively from the bottom to the top of the mass in the silo. By virtue of the cone 35 disposed within the silo as described, segregated particles in the silo become substantially completely reunited at the drain spout into the desired mixture of sizes and are discharged as such. The paths of flow of the particles, by virtue of the cone 35, when the discharge outlet 32 is opened, are depicted by the light lines in FIG. 6. A similar depiction is presented in FIG. 8 hereinafter referred to.

Moreover, by virtue of the arrangement described, granules of successive batches charged into the silo may be discharged from the silo in corresponding sequence.

The form and arrangement of the cone 35 for causing the granules to flow in the manner above described, when discharged from the silo, has particular utility in the case of cylindrical containers which have their discharge opening located centrally of the bottom. The invention is also adaptable for use with containers of this type, but divided or split into two compartments.

The latter adaption is illustrated in FIG. 8. As there shown, the cylindrical silo or other container 40 is split into two compartments by a vertical partition 43, extending axially throughout its height, down through the inverted-cone bottom section 41 and to the discharge pipe 42. According to this embodiment of the invention, the desired flow of the granules in being discharged is achieved by suspending half-cones 45, 45a, immediately above the inverted cone bottom 41, each of the half-cones being attached at its vertical face to one side of partition 43. The base of each of the half-cones will be of a radius such that the sum of the radii will bear substantially the same relationship to the diameter of container 40 as described in connection with the embodiment of FIGS. 6 and 7. The base of half-cone 45 is preferably in horizontal alignment with that of half-cone 45a, as shown in FIG. 8, and the plane in which these bases lie is spaced not more than about six inches from the plane of the discharge opening at the apex of the truncated inverted cone bottom section of the silo.

In the embodiment of the invention shown in FIGS. 6 to 8, the silos are, as stated, of the cylindrical type, having an inverted-cone bottom leading to the discharge outlet.

The invention, however, is readily adaptable to non-cylindrical containers having equal sides, such as square silos or bins, as in the embodiment illustrated in FIGS. 9 and 10. As shown, the container 50 is square in cross-section, and accordingly, has its bottom section 51 (corresponding to portion 31 of the silo shown in FIG. 6) in the form of an inverted-pyramid with its truncated end joining the discharge outlet 52.

In order to provide for flow of granular material in its discharge from a square-type container as represented in FIG. 9, in the manner described in connection with FIGS. 6-8, a square pyramid 55 is suspended therein immediately above the inverted-pyramid bottom portion of container 50. Each side of pyramid 55 at the base thereof should be of a length of from about 55% to 60% of the horizontal dimension of each side of the container. This relationship, in other words, is substantially the same as that between the diameter of cone 35 and the diameter of the cylindrical container in the embodiment of FIGS. 6 and 7. Likewise, the base of the pyramid 55 should be in a plane spaced not more than about six inches above the plane of the bottom of the container.

FIG. 10 illustrates an embodiment of the invention wherein the container 60 is of square cross-section, as in that of FIG. 9, but wherein it is split into two compartments. As shown in FIG. 10, the partition 63 is disposed diagonally of the container, with its lower end formed to extend down through the inverted-pyramid bottom 61 and to the discharge spout 62. In order to control the flow of the granules from each of the compartments 60A and 60B in the manner above described with reference to other embodiments, triangular pyramids 65A and 65B, are suspended in each of the compartments, respectively. As will be understood, the dimensions of the pyramids 65A, 65B, and their spacing above the discharge spout will bear the relationship to the size of container 60 as above set forth in connection with the other illustrated embodiments.

Preferably, separate pipes or chutes are attached at the discharge spout in the embodiments of FIGS. 8 and 10.

Although the invention has been described above with particular reference to the handling of granules used in the manufacture of asphalt roofing and siding, it will be apparent that it is equally applicable to the handling of other particulate material composed of mixtures of different sizes. Thus, the invention may be used in connection with silos, bins or other containers of the type described, employed for handling mixtures of different sized aggregate which exhibit the segregation tendency herein referred to.

I claim:

1. Apparatus for handling particulate material composed of particles of different sizes and required to be transferred to another location, comprising a vertically elongated cylindrical container adapted to be charged with said material at the center of the top thereof and having an inverted-cone bottom portion leading to a discharge opening disposed centrally at the bottom of the container, and a relatively shallow cone-shaped member suspended substantially immediately above and in the proximity of said discharge opening, the base of said cone-shaped member being disposed slightly below the connection of said inverted-cone bottom portion with the cylindrical portion of the container and extending in the direction of said discharge opening and having a diameter within the range of 55% to 60% of the diameter of said container, and the apex of said cone-shaped member being imperforate.

2. Apparatus for handling particulate material composed of particles of different sizes and required to be transferred to another location, comprising a vertically elongated container having a square cross-sectional configuration adapted to be charged with said material at the center of the top thereof and having an inverted-pyramid bottom portion leading to a discharge opening disposed centrally at the bottom of the container, and a relatively shallow square pyramid-shaped member suspended substantially immediately above and in the proximity of said discharge opening, the base of said square pyramid-shaped member being disposed slightly below the connection of said inverted-pyramid portion with the square cross-sectional portion of the container and extending in the direction of said discharge opening and having its sides of a length within the range of 55% to 60% of the transverse dimension of the sides of said container, and the apex of said pyramid-shaped member being imperforate.

3. Apparatus for handling particulate material composed of particles of different sizes and required to be transferred from one location to another, comprising a vertically elongated container adapted to be charged with said material at the center of the top thereof, and having a downwardly and inwardly inclined bottom section leading to a discharge opening disposed centrally at the bottom of the container, and a flow control member suspended in said container, said flow control member being disposed substantially immediately above and in the proximity of said discharge opening and constituting a geometric surface having its apex imperforate and disposed along the vertical axis of the container and being inclined downwardly and outwardly from said apex to its base, the base of said surface being disposed slightly below the connection of said inclined bottom portion with the vertically extending portion of the container and extending in the direction of said discharge opening and having a geometric outline corresponding to the transverse cross-sectional outline of the container, the perimeter of said base being from about 55% to 60% of the perimeter of said cross-sectional outline of the container.

References Cited in the file of this patent

UNITED STATES PATENTS

| | | |
|---|---|---|
| 1,271,420 | Bewan | July 2, 1918 |
| 1,339,682 | Allen | May 11, 1920 |
| 2,634,842 | Caylor | Apr. 14, 1953 |
| 2,670,105 | Huhn | Feb. 23, 1954 |
| 2,686,617 | Tolman et al. | Aug. 17, 1954 |

FOREIGN PATENTS

| | | |
|---|---|---|
| 491,095 | Italy | Feb. 23, 1954 |
| 878,773 | Germany | June 5, 1953 |